| United States Patent [19] | [11] Patent Number: 4,550,148 |
|---|---|
| Droescher et al. | [45] Date of Patent: Oct. 29, 1985 |

[54] MOLDING COMPOSITIONS BASED ON HIGH MOLECULAR WEIGHT POLYALKYLENE TEREPHTHALATES

[75] Inventors: Michael Droescher, Dorsten; Klaus Burzin, Marl; Christian Gerth; Horst Heuer, both of Haltern, all of Fed. Rep. of Germany

[73] Assignee: Chemische Werke Huels Aktiengesellschaft, Marl, Fed. Rep. of Germany

[21] Appl. No.: 691,826

[22] Filed: Jan. 16, 1985

[30] Foreign Application Priority Data

Jan. 17, 1984 [DE]  Fed. Rep. of Germany ....... 3401345

[51] Int. Cl.$^4$ ...................... C08G 63/76; C08L 67/02
[52] U.S. Cl. .................................... 525/440; 528/288
[58] Field of Search ......................... 525/440; 528/288

[56] References Cited

U.S. PATENT DOCUMENTS

| 3,919,218 | 11/1975 | Schmitt et al. | 528/44 X |
| 4,022,752 | 5/1977 | Horn et al. | 525/440 X |
| 4,034,016 | 7/1977 | Baron et al. | 525/440 X |
| 4,317,764 | 3/1982 | Sheer | 525/63 X |

*Primary Examiner*—Lucille M. Phynes
*Attorney, Agent, or Firm*—Millen & White

[57] ABSTRACT

Improved molding compositions based on high-molecular polyalkylene terephthalates are obtained by heating at 240°–300° C. a melt containing a mixture of (A) a polyalkylene terephthalate having a viscosity number J of at least 50 cm$^3$/g, and
(B) 0.05–2.5 parts by weight, based on 100 parts by weight of the molding composition of a cyclic, trimerized isophorone diisocyanate or an oligomer thereof with a degree of oligomerization of 2–5 with an isocyanate functionality of 3–7.

5 Claims, No Drawings

MOLDING COMPOSITIONS BASED ON HIGH MOLECULAR WEIGHT POLYALKYLENE TEREPHTHALATES

BACKGROUND OF THE INVENTION

The present invention relates to molding compositions based on high viscosity, high-molecular weight polyalkylene terephthalates.

Polyethylene terephthalate having a viscosity number of >75 cm$^3$/g can be manufactured and processed in a relatively convenient manner. The same holds true for polybutylene terephthalate with a viscosity number of >120 cm$^3$/g. Polyesters having a higher viscosity are required for a variety of industrial uses. However, processing such polyesters necessitates a marked increase in manufacturing costs.

It is known from German Pat. Nos. 3,033,468 and 3,033,469 to produce higher-molecular polyalkylene terephthalates by solid phase recondensation from products having a lower molecular weight. However, manufacture is time- and energy-consuming, and the processability of molding compositions made therefrom is not improved.

It is also known that an increase in molecular weight of polyesters can be obtained during processing by crosslinking reactions with difunctional compounds, such as, for example, difunctional isocyanates. Thus, European Pat. No. 56 293 describes a process for premixing polyethylene terephthalate, or polymer mixtures based on polyethylene terephthalate, with organic diisocyanates and processing the mixture in a twin-screw extruder with a degasifying zone heated to a temperature of between 280° and 320° C. However, molding compositions containing aromatic diisocyanates prepared according to the teaching of that patent tend toward discoloration. Aliphatic or cycloaliphatic diisocyanates, which do not cause discoloring, are significantly less reactive and markedly more toxic, as compared with the aromatic diisocyanates.

OBJECT OF THE INVENTION

It is an object of the invention to provide molding compositions based on high molecular weight polyalkylene terephthalates (viscosity number J>80 cm$^3$/g), which also exhibit good processing properties.

Upon further study of the specification and appended claims, further objects and advantages of this invention will become apparent to those skilled in the art.

SUMMARY OF INVENTION

These objects have been attained by molding compositions comprising a mixture of
(A) a polyalkylene terephthalate having a viscosity number J of at least 50 cm$^3$/g and
(B) 0.05-2.5 parts by weight, based on 100 parts by weight of the molding composition, of a cyclic, trimerized isophorone diisocyanate or an oligomer thereof with a degree of oligomerization of 2-5 with an isocyanate functionality of 3-7,
wherein the mixture of components (A) and (B) is thermally treated in the melt at 240°-300° C.

DETAILED DESCRIPTION

The cyclic, trimerized isophorone diisocyanate, as well as its oligomers with a degree of oligomerization of 2-5, useful in the practice of the present invention, and also their manufacture, are known from U.S. Pat. No. 3,919,218. Mixtures of these diisocyanates can also be used as component (B). Cyclic, trimerized isophorone diisocyanate is preferred. The diisocyanate component is employed in amounts of 0.05-2.5 parts by weight, preferably 0.1-1.5 parts by weight, based on 100 parts by weight of the molding composition.

In addition to polypropylene terephthalate, polyethylene terephthalate and polybutylene terephthalate are preferably utilized as the polyalkylene terephthalates. Up to 20 mol-%, preferably 5-15 mol-%, of the terephthalic acid in the polyalkylene terephthalate can be replaced by aromatic, cycloaliphatic or aliphatic dicarboxylic acids. Examples of suitable dicarboxylic acids are isophthalic acid, phthalic acid, cyclohexane-1,4-dicarboxylic acid, adipic acid, sebacic acid, azelaic acid, decanedicarboxylic acid or similar compounds. Up to 20 mol-%, preferably 5-15 mol-% of the diol can be substituted by aliphatic or cycloaliphatic diols, such as, for example, ethylene glycol, 1,3-propanediol, 1,4-butanediol, 1,6-hexanediol, neopentyl glycol, 1,4-dimethylolcyclohexane, 1,12-dodecanediol or similar compounds.

The term polyalkylene terephthalate also covers block copolyesters. Such copolyesters are described, for example, in Chimia 28 (9): 544–552 (1974) and in Rubber Chemistry and Technology 50: 688–703 (1977). These block copolyesters contain, besides the above-mentioned aromatic dicarboxylic acids and diols, a polyoxyalkylene diol having a molecular weight in the range from about 600 to 2,500. Preferred polyoxyalkylene diols are polyoxyethylene diol, polyoxypropylene diol, and polyoxytetramethylene diol. The proportion of the polyoxyalkylene diols is in the range of 4-40% by weight, preferably 10-35% by weight, based on block copolyester.

The polyalkylene terephthalates utilized according to this invention are produced conventionally by interesterification or esterification and subsequent polycondensation of terephthalic acid or its polyester-forming derivatives, as well as the corresponding diol, in the presence of catalysts (Sorensen and Campbell, Preparative Methods of Polymer Chemistry, Interscience Publishers Inc., NY 1961, pages 111–127; "Kunststoff-Handbuch" [Plastics Manual] vol. VIII, C. Hanser Publishers, Munich, 1973; and Journal of Polymer Science, part A 1, 4: 1851–1859, 1966). In addition to homo- and copolyesters, polyester mixtures can also be utilized in practicing the present invention.

Polyalkylene terephthalates suitable for producing molding compositions according to the present invention exhibit a viscosity number J of at least 50 cm$^3$/g. In the case of polyethylene terephthalate as the starting material, polyesters having a viscosity number J of 55-75 cm$^3$/g are preferred. In the case of the other types of polyesters, products with a viscosity number J of 80-120 cm$^3$/g are preferably selected as the starting materials.

In order to produce the molding compositions of this invention, a mixture of polyalkylene terephthalate and diisocyanates according to component (B) is prepared at room temperature. A kneader, which can be operated continuously or discontinuously, is utilized for thermal treatment of the melt. Generally, the treatment period at a temperature between 240°-300° C. and preferably between 250°-270° C. is 1-5 minutes with a continuous mode of operation, and 2-20 minutes with a discontinuous mode of operation. For polyethylene terephthalate, preferred temperature range is from 260° to 280° C.

The polyalkylene terephthalates contained in the molding compositions of this invention exhibit, in case of polyethylene terephthalate, a viscosity number J of >80 cm$^3$/g, preferably 90–135 cm$^3$/g. In case of the other polyester types, the viscosity number of the final product is >130 cm$^3$/g, preferably 140–180 cm$^3$/g.

Other polymers conventional in polyester technology can be incorporated into the molding compositions of this invention, such as, for example, polyamides ("Faserforsch. Textiltechn." [Fiber Research, Textile Technology] 27 (2): 81–86 [1976]), polyether ester amides (DOS 2,930,343), polyether esters (U.S. Pat. No. 4,317,764), functionalized EPDM elastomers (DOS 2,622,876). These polymer components are contained in the resultant mixtures in an amount of 1–40 parts by weight, preferably 5–25 parts by weight.

Customary additives and auxiliary agents, such as pigments, processing aids, fillers and reinforcements, and stabilizers against hydrolysis, heat or UV, can be incorporated during manufacture as well as into the finished, treated molding compositions.

The molding compositions of this invention show a number of advantages over corresponding prior-art products: They are more easily handled during manufacture; they do not exhibit any discoloration; and they show no tendency toward crosslinking.

The viscosity number (J) was determined according to DIN [German Industrial Standard] 16 779, part 2, on solutions of 0.5 g of polyalkylene terephthalate in 100 ml of phenol/ortho-dichlorobenzene (50/50 parts by weight) at 25° C.

Experiments characterized by letters are not in accordance with the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Under a nitrogen atmosphere, 50 g of homopolybutylene terephthalate (J=110 cm$^3$/g) is mixed at 250° C. with varying amounts of isophorone diisocyanate oligomer (isocyanate functionality: 3.2), as indicated in the table, for 15 minutes in a laboratory kneader. The resultant increase in viscosity number can be seen from the table.

TABLE

| Experiment | Isophorone Diisocyanate [g] | J [cm$^3$/g] |
| --- | --- | --- |
| 1 | 0.06 | 130 |
| 2 | 0.125 | 137 |
| 3 | 0.25 | 151 |
| 4 | 0.5 | 182 |
| A | 1.5 | Gel Proportions |

TABLE-continued

| Experiment | Isophorone Diisocyanate [g] | J [cm$^3$/g] |
| --- | --- | --- |
| | | tions |

The products are not discolored and are free of bubbles.

EXAMPLE 2

At 22° C., 990 g of granulated homopolybutylene terephthalate (J=110 cm$^3$/g) and 10 g of isophorone diisocyanate oligomer (isocyanate functionality: 3.2) are mixed in a tumbling mixer. Then extrusion is performed in a twin-screw extruder at 250° C. (residence time: 2 minutes). The resulting molding composition is free of bubbles, shows no discoloring, and has a viscosity number of 130 cm$^3$/g.

EXAMPLE 3

In a tumbler mixer, 600 g of homopolybutylene terephthalate (J=110 cm$^3$/g), 390 g of homopolyethylene terephthalate (J=72 cm$^3$/g), as well as 15 g of isophorone diisocyanate oligomer (isocyanate functionality: 3.2) are mixed together at 22° C. Then extrusion is carried out in a twin-screw extruder at 255° C. (residence time: 2 minutes). The molding composition is free of bubbles, shows no discoloration, and has a viscosity number of 113 cm$^3$/g.

The preceding examples can be repeated with similar success by substituting the generically or specifically described reactions and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A molding composition based on a high-molecular polyalkylene terephthalate having a viscosity number J of >80 cm$^3$/g, prepared by heating at 240°–300° C. a molten mixture of
    (A) polyalkylene terephthalate having a viscosity number J of at least 50 cm$^3$/g, and
    (B) 0.05–2.5 parts by weight, based on 100 parts by weight of the molding composition, of a cyclic, trimerized isophorone diisocyanate or an oligomer thereof with a degree of oligomerization of 2–5 with an isocyanate functionality of 3–7.

2. A molding composition according to claim 1, wherein the diisocyanate is cyclic, trimerized isophorone diisocyanate.

3. A molding composition according to claim 1, wherein the mixture contains 0.1–1.5 parts by weight of the diisocyanate.

4. A process for the preparation of a molding composition having a viscosity number J of >80 cm$^3$/g which comprises heating at 240°–300° C. a molten mixture of
    (A) polyalkylene terephthalate having a viscosity number J of at least 50 cm$^3$/g, and
    (B) 0.05–2.5 parts by weight, based on 100 parts by weight of the molding composition, of a cyclic, trimerized isophorone diisocyanate or an oligomer thereof with a degree of oligomerization of 2–5 with an isocyanate functionality of 3–7.

5. A process according to claim 4, wherein the heating is at 250°–280° C.

* * * * *